United States Patent [19]
Wörner et al.

[11] Patent Number: 5,533,602
[45] Date of Patent: Jul. 9, 1996

[54] TURBINE WHEEL OF A HYDRODYNAMIC CONVERTER

[75] Inventors: Otto Wörner, Reutlingen; Rudolf Reinhardt, Esslingen; Heinz Schultz, Hochdorf, all of Germany

[73] Assignee: Mercedes-Benz AG, Stuttgart, Germany

[21] Appl. No.: 364,182

[22] Filed: Dec. 27, 1994

[51] Int. Cl.⁶ .................. F16H 45/02; B23K 20/12
[52] U.S. Cl. .............. 192/3.29; 228/2.3; 228/114.5
[58] Field of Search .................. 192/3.29, 3.28, 192/3.3; 228/2.3, 2.1, 114.5

[56] References Cited

U.S. PATENT DOCUMENTS

| | | |
|---|---|---|
| 3,777,360 | 12/1973 | Welch . |
| 4,099,603 | 7/1978 | Peppel . |
| 4,440,338 | 4/1984 | Stevenson ......................... 228/2.3 |
| 4,924,978 | 5/1990 | Ohkubo . |
| 5,215,173 | 6/1993 | Gimmler ....................... 192/3.29 X |

FOREIGN PATENT DOCUMENTS

| | | |
|---|---|---|
| 1079219 | 8/1967 | European Pat. Off. . |
| 0486755A3 | 5/1992 | European Pat. Off. . |
| 2314838 | 1/1977 | France . |
| 2457932 | 6/1975 | Germany . |
| 3915186C1 | 2/1990 | Germany . |
| 4338072 | 10/1994 | Germany .................. 192/3.29 |
| 2245562A | 12/1990 | Japan . |
| 4-224354A | 12/1992 | Japan . |

OTHER PUBLICATIONS

European Search Report Dec. 29, 1995.
Kuka Publication #19, Wichelhaus and Grunauer, Oct. 1975.
Kuka Publication, Reprint from Der Praktiker, 1971, pp. 104–106.
Schweissen un Schneiden, Reprint from VDI-Z, Oct. 1985, pp. 801–812.
Schweissen und Schneiden, 1968, vol. 11, p. 604–608.

*Primary Examiner*—Rodney H. Bonck
*Attorney, Agent, or Firm*—Evenson McKeown Edwards & Lenahan

[57] ABSTRACT

In the case of a turbine wheel of a hydrodynamic torque converter having a lockup clutch, a radial flange of a hub is connected on its faces, in each case, by means of friction welding, with one radial flange respectively of an outer shell holding turbine blades and of a disk support which non-rotatably holds clutch disks.

16 Claims, 4 Drawing Sheets

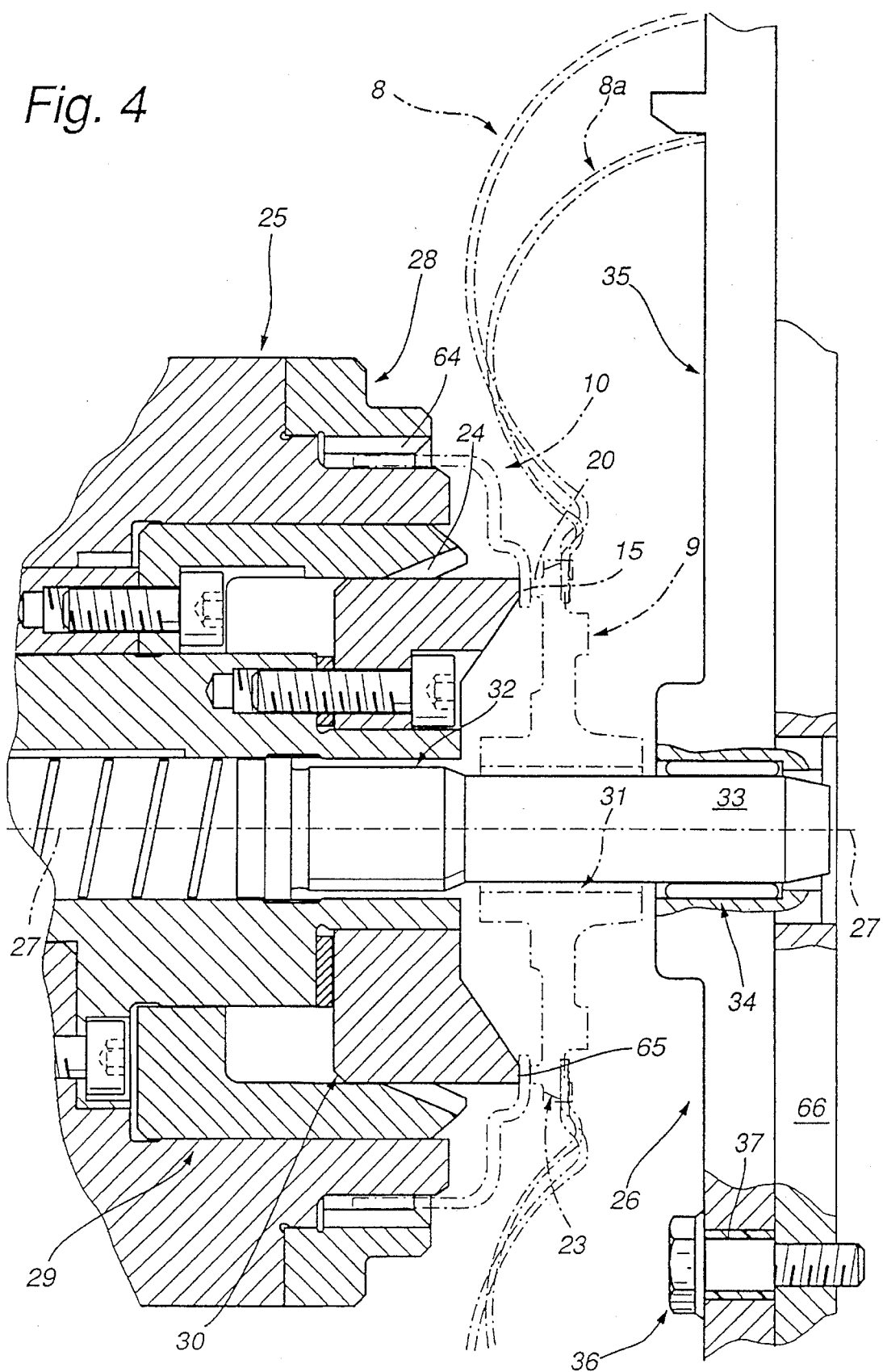

TURBINE WHEEL OF A HYDRODYNAMIC CONVERTER

BACKGROUND AND SUMMARY OF THE INVENTION

This invention relates to a turbine wheel of a hydrodynamic torque converter of the type having a lockup clutch and a turbine wheel.

A hydrodynamic torque converter comprising a lockup clutch and a turbine wheel of the initially mentioned type is the object of U.S. Pat. No. 5,441,135 originating from the applicant (which is not prior art). In the case of this torque converter, a bell-shaped housing shell, which rotatably receives an inward-flow turbine wheel, is connected with the outer shell of a pump wheel in a manner which is pressure-sealed and fixed with respect to movements, and with the turbine wheel by means of a lockup clutch which can be actuated by a clutch actuator of an axial-piston construction. The clutch disks of the lockup clutch are alternately non-rotatably held on two annular disk supports which are aligned concentrically with respect to the axis of rotation of the converter. In the case of this torque converter, a trouble-free heat dissipation is endeavored so that a sensitive, precisely apportionable control of the clutch slip of the lockup clutch is ensured which is actually used for saving fuel but, on the other hand, by regulating a defined slip condition, has the purpose of preventing the transmission of torque irregularities of the driving engine to the transmission line arranged behind the torque converter in the power flux. For this purpose, a housing-internal clutch space is provided in the case of the torque converter, which clutch space is bounded, in one direction of the axis of rotation of the converter, by a radial end wall of the housing shell and, in the opposite direction, is bounded by the turbine wheel. At a radially outer point, the clutch space has a flow connection with an annular gap between the pump wheel outlet and the turbine wheel inlet and, at a radially inner point, has a flow connection with a converter return flow pipe. The disk supports are provided with radial flow-through openings and are arranged to be situated with their whole length transversely in the inward flow of the clutch space which occurs between the two flow connections.

In the case of hydrodynamic torque converters, it is known to connect the lockup clutch by means of a torsional vibration damper with the hub of the turbine wheel (German Patent Document DE 39 15 186 C1; Japanese Patent Document JP-2 245562 A. in *Patent Abstr. of Japan*, Section M., Vol. 14 (1990), No. 572 (M-1061). In the case of one of these known constructions (Japanese Patent Document JP 4-224354 A. in *Patent Abstr. of Japan*, Sec. M, Vol. 16 (1992), No. 576 (M-1345"), a flange of the hub is in this case clamped in the directions of the axis of rotation between one flange respectively of the torsional vibration damper and the outer shell of the turbine wheel.

From KUKA Publication No. 19, of October 1975 (Reprint from DE-Z MM No. 70/1975), more generally, the prerequisites and possibilities of friction butt welding are known as well as the corresponding joining part preparation. Accordingly, the joining of parts with unequal cross-sections of the joint locations, like the welding of bolts or pipes on metal sheets, is to be carried out without difficulties. Plane or machined clamping surfaces of sufficient sizes would have to exist at the joining parts so that they can be clamped in precise positions and sufficiently tightly. Mentioned examples of applications are, among others, rotors for turbochargers as well as turbine wheels.

According to German Publication DE-Z *Der Praktiker*, No. 5, 1971—Page 5 (Reprint in KUKA Publication "Entwicklung und Anwendung von Reibschweissmaschinen in Deutschland" ("Development and Application of Friction Welding Machines in Germany"), it is indicated that manufacturing engineers and constructing engineers consider friction welding more and more. It is said that workpieces are reconstructed with respect to the process; the machining sequence, overmeasures of material and tolerances are changed; and additional prerequisites are therefore created for the further use of this fast and precise welding operation.

In *VDI-Z*, Volume 128 (1986) No. 20—October, Pages 801–812, reference is made to the fact that the telespectrum should comprise, among others, turbine wheels and rotor disk rims, and that friction welding was supposed to be successful for the manufacturing of high-precision components.

In German Publication DE-Z *Schweissen und Schneiden*, Year 20 (1968), Vol. 11, Pages 604–608, it is stated that friction welding as a joining process for butt seams has some very important advantages with respect to manufacturing as well as welding techniques in comparison to the joining technologies used here in the case of a number of motor vehicle parts.

It is an object of the present invention to design the turbine wheel with respect to its non-rotatable joints between the outer shell, the hub and the disk support in such a manner that an industrial-scale manufacturing is permitted which is simple with respect to manufacturing techniques and low in cost.

Based on a turbine wheel of the type mentioned above, this object is achieved according to the invention by providing an arrangement wherein the flange of the disk support is offset radially toward the inside with respect to the clutch disks, wherein the hub has on its outer circumference a radial flange with a cylindrical outer jacket surface and with a face which faces the flange of the disk support and is situated in a flange plane which is normal with respect to the axis of rotation, wherein the face of the flange of the hub facing the disk support has an axial projection which is concentric with respect to the axis of rotation, the outside diameter of the projection being smaller than the diameter of the outer jacket surface of the flange of the hub, wherein the flange of the disk support is connected with the projection on the facing face of the flange of the hub and the flange of the outer shell is connected with the projection on the other face of the flange of the hub, each by means of friction welding, and wherein on the flange of the hub in the transition area between the outer jacket and the face facing the flange of the disk support, parts-side form-fitting surfaces are developed for the rotational drive of the hub by means of counter-form-fitting surfaces of a receiving device of a friction welding machine which grips the hub and is rotationally driven.

According to the preferred embodiments of the invention, a hydrodynamic torque converter is thus constructed comprising:

a lockup clutch, an outer shell holding turbine blades, a hub non-rotatably joining the outer shell with a turbine wheel shaft, and a disk support for non-rotatable joining clutch disks of the lockup clutch with the outer shell, wherein said hub includes a radial flange which is connected on one axially facing side with the outer shell by a first friction weld connection and is connected at an opposite axial facing side with the disk support by a second friction weld connection, and wherein the hub is provided with form-fitting surfaces at its side facing the disk support for accommodating rotational drive of the hub by means of counter-form-fitting surfaces of a receiving device of a friction welding machine which grips the hub and is rotationally driven.

In the case of the turbine wheel according to the invention, the non-rotatable joints between the hub, on the one hand, and the outer shell as well as the disk support, on the other hand, require only very limited space.

In the case of the turbine wheel according to the invention, the friction weld joint between the hub and the outer shell may be constructed with a larger diameter with respect to the axis of rotation of the converter than the friction weld joint between the hub and the disk support. As a result, both friction weld joints may be produced on one welding machine with a universal receiving device for the hub and the disk support.

In the case of the turbine wheel according to the invention, the joining parts do not require any special machining for the friction welding. The precision with respect to center deviations and wobbling, axial length, etc. are essentially determined by the friction welding machine and the receiving devices for the joining parts.

According to the invention, the machining time during the friction welding of the turbine wheel is very short.

In the case of the turbine wheel according to the invention, the joining operation can be automated and the process according to German Patent Application P 43 41 954.2 (corresponding to copending, commonly assigned U.S. application filed Dec. 9, 1994) can be used.

In the case of the turbine wheel according to the invention, after the welding operation with respect to the hub—outer shell joint is completed, the receiving devices for the outer shell which is now connected with the hub, can be moved back and, subsequently, the disk support can be clamped into the rotationally drivable universal receiving device which was used in the preceding welding operation for holding the hub.

In the case of the turbine wheel according to the invention, a reinforcing plate is eliminated which would have to be soldered to the flange of the outer shell if the flange of the hub and the flange of the outer shell and the flange of the disk support were non-rotatably fixed with respect to one another by a common riveted connection.

At the end of the friction welding operation after the cooling or during the cooling of the welding zone, because of the still rotating rotationally drivable receiving device, its coaxiality with respect to the other receiving device may be cancelled. This coaxiality error will be the larger the more elastic the machine frame between the receiving devices. These elasticities may be eliminated by the use of a bearing arrangement for the mutual centering of the receiving devices in the center of the axis of rotation.

For avoiding coaxiality errors, which are caused by the temperature course of the welding machine, in addition to the mutual centering of the receiving devices, the arrangement may be made in such a manner that the receiving device for the outer shell has a special part which, with respect to the receiving device, is fixed with respect to movements but, in the directions which are perpendicular with respect to the axis of rotation, is arranged with a limited elasticity and is used for the actual holding of the outer shell.

Other objects, advantages and novel features of the present invention will become apparent from the following detailed description of the invention when considered in conjunction with the accompanying drawings.

BRIEF DESCRIPTION OF THE DRAWINGS

FIG. 4 is a representation of the universal receiving device corresponding to FIG. 3 in a second embodiment.

DETAILED DESCRIPTION OF THE DRAWINGS

Figure 1:
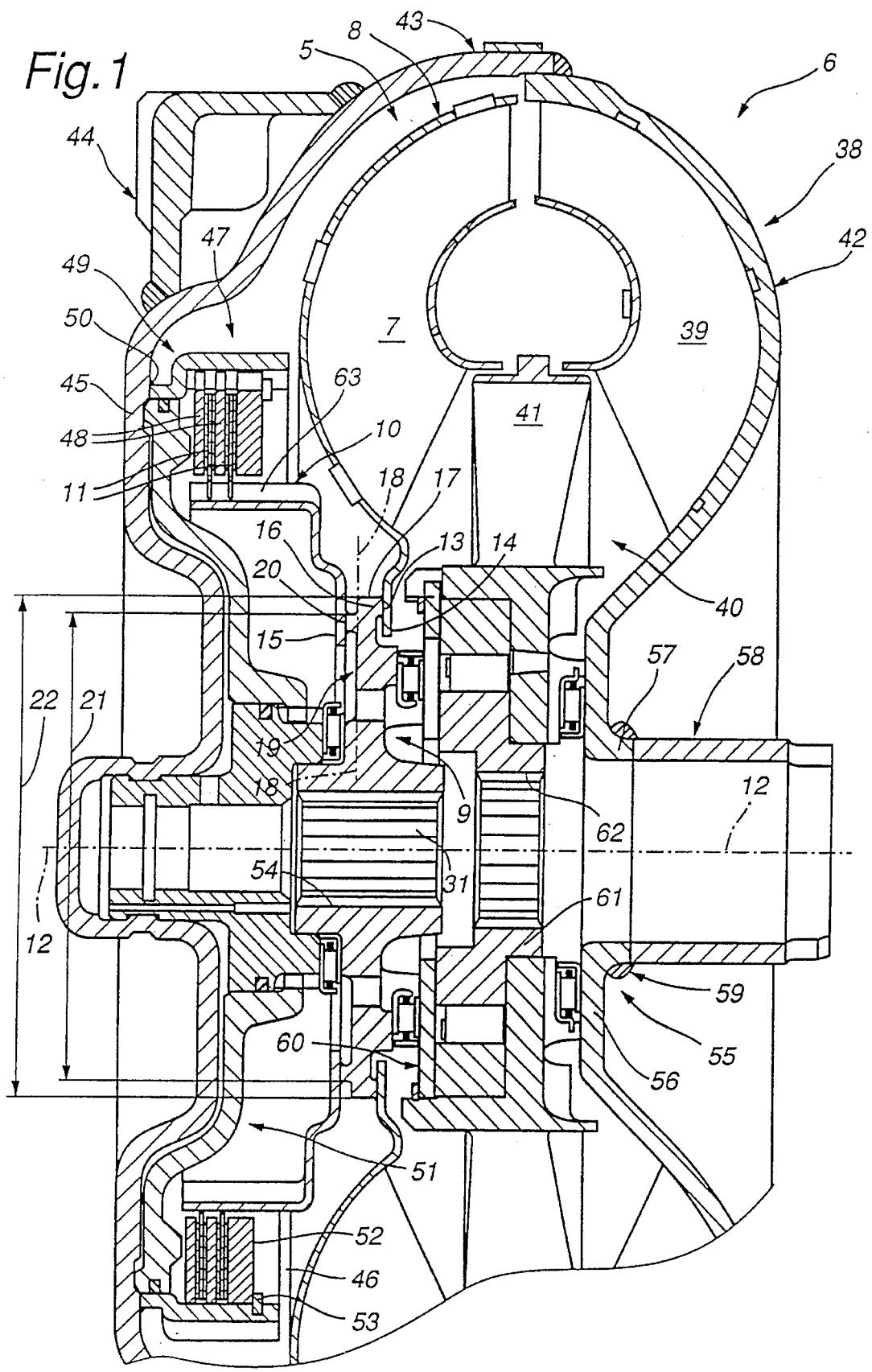
FIG. 1 is a sectional view of a hydrodynamic torque converter comprising a lockup clutch and comprising a turbine wheel according to the invention, said sectional view being in a plane containing the axis of rotation of the converter.

According to FIG. 1, a hydrodynamic torque converter 6 comprises a pump wheel 38 with pump vanes 39, an inward-flow turbine wheel 5 with turbine blades 7 as well as a stator 40 with guide vanes 41. The outer shell 42 of the pump wheel 38 is connected in a conventional and fixed manner with respect to pressure and movements with a housing shell 43 reaching over the turbine wheel 5, which housing shell 43 has outer fastening lugs 44 by way of which the pump wheel 38 of the torque converter 6 can be driven in a known fashion by the crankshaft of a driving engine of a motor vehicle.

Between a radial end wall 45 of the housing shell 43 and the turbine wheel 5, a clutch space 46 is formed inside the housing shell 43 for the arrangement of a lockup clutch 47. The lockup clutch 47 has internal clutch disks 11 and external clutch disks 48 which radially engage in one another in a known manner. The internal clutch disks 11 are held on an internal disk support 10 in a non-rotatable and axially displaceable manner, which internal disk support 10 comprises a flange 15 which is arranged to be radially offset toward the inside with respect to the axis of rotation 12—12 of the converter relative to the clutch disks 11, for the non-rotatable connection with a hub 9 of the turbine wheel 5. The external clutch disks 48 are non-rotatably and axially displaceably held on an external disk support 49 which, at reference number 50, is held in a fixed manner with respect to pressure and movements by means of a friction weld joint on the radial end wall 45. In a known manner, the lockup clutch 47 can be engaged by means of a clutch actuator 51 of an axial-piston construction arranged on the end wall 45, in which case the clutch disks 11, 48 can be supported by way of an abutment disk 52 on a retaining ring 53 engaged in an inner circumferential groove of the external disk support 49.

The turbine wheel 5 has an outer shell 8 which holds the turbine blades 7 on their outer edges and which is provided with a flange 14 directed radially toward the inside, for the non-rotatable connection with the hub 9.

For its non-rotatable joining by means of the respective friction welding with the outer shell 8 and the disk support 10, the hub is provided on its outer circumference with a radial flange 16 which is radially bounded by a cylindrical outer jacket 7. On its face opposite to the end wall 45, the flange 16 has an axial projection 13 which is concentric with respect to the axis of rotation 12—12 of the converter and which is radially bounded toward the outside by the outer jacket surface 17 and is connected with the flange 14 of the outer shell 8 by a friction weld joint in a manner which is fixed with respect to movements.

In the direction of the axis of rotation 12—12 of the converter pointing to the end wall 45, the flange 16 of the hub 9 is bounded by a face 19 which is situated in a hub plane 18—18 which is perpendicular with respect to the axis of rotation 12—12 of the converter and therefore changes in a sharp-edged manner into the outer jacket surface 17 so that, in this transition area, the parts-side form-fitting surfaces 23 (FIG. 2 to 4) can be generated during the friction welding (joining of components 14 and 16).

An axial projection 20 originates from the face 19 in the direction of the axis of rotation 12—12 of the converter which points toward the end wall 45, which axial projection 20 is situated concentrically with respect to the axis of rotation 12—12 of the converter and has an outside diameter 21 which is smaller than the outside diameter 22 of the flange 16. In this manner, the projection 20, which is connected with the flange 15 of the disk support 10 by means of friction welding, is offset radially toward the inside with respect to the projection 13, whereby the friction welding of the hub 9 and the outer shell 8, on the one hand, as well as the friction welding of the hub 9 and the disk support 10, on the other hand, becomes possible by means of a single universal receiving device 25 (FIGS. 2 to 4) for the hub and the disk support.

The inward-flow force components in the transition area between the outer jacket surface 17 and the face 19 resulting from the molding-on of the parts-side form-fitting surfaces 23 cannot lead to deformations of the flange 16 because the latter is without any undercut with respect to the face 19.

For the conventional non-rotatable joining of the turbine wheel 5 with a turbine wheel shaft, which is not shown, the central opening 31 of the hub 9 has an axial driving gearing 54.

The outer shell 42 of the pump wheel 38 ends radially on the inside in a hub 55 which consists of a flange 56 which is provided with a thick wall thickness as well as of an adjoining axial connecting branch 57 which is rigidly connected with a centric bearing sleeve 58 by means of a friction weld joint 59.

In a known manner, the stator 40 can be supported by way of an overriding clutch 60 on a non-rotating stator shaft, which is not shown, the secondary side of the overrunning clutch have an inner hub 61 with an axial driving gearing 62 for the non-rotatable connection with the stator shaft.

Figure 2:
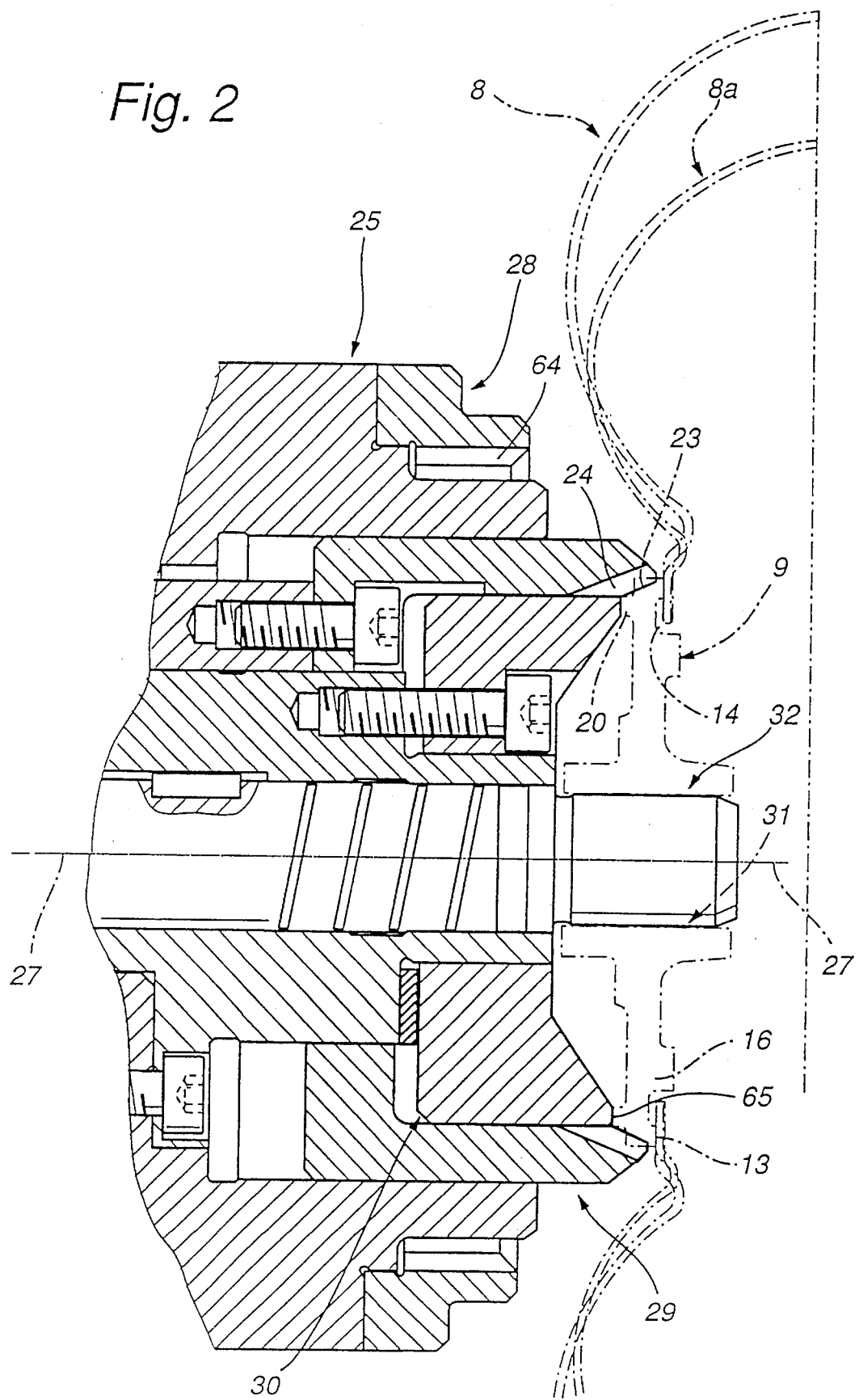
FIG. 2 is a sectional view of a rotationally drivable universal receiving device of a friction welding machine for manufacturing friction weld joints in the case of the turbine wheel of FIG. 1 in a plane containing the axis of rotation of the receiving device, in a first operating position.
Figure 3:
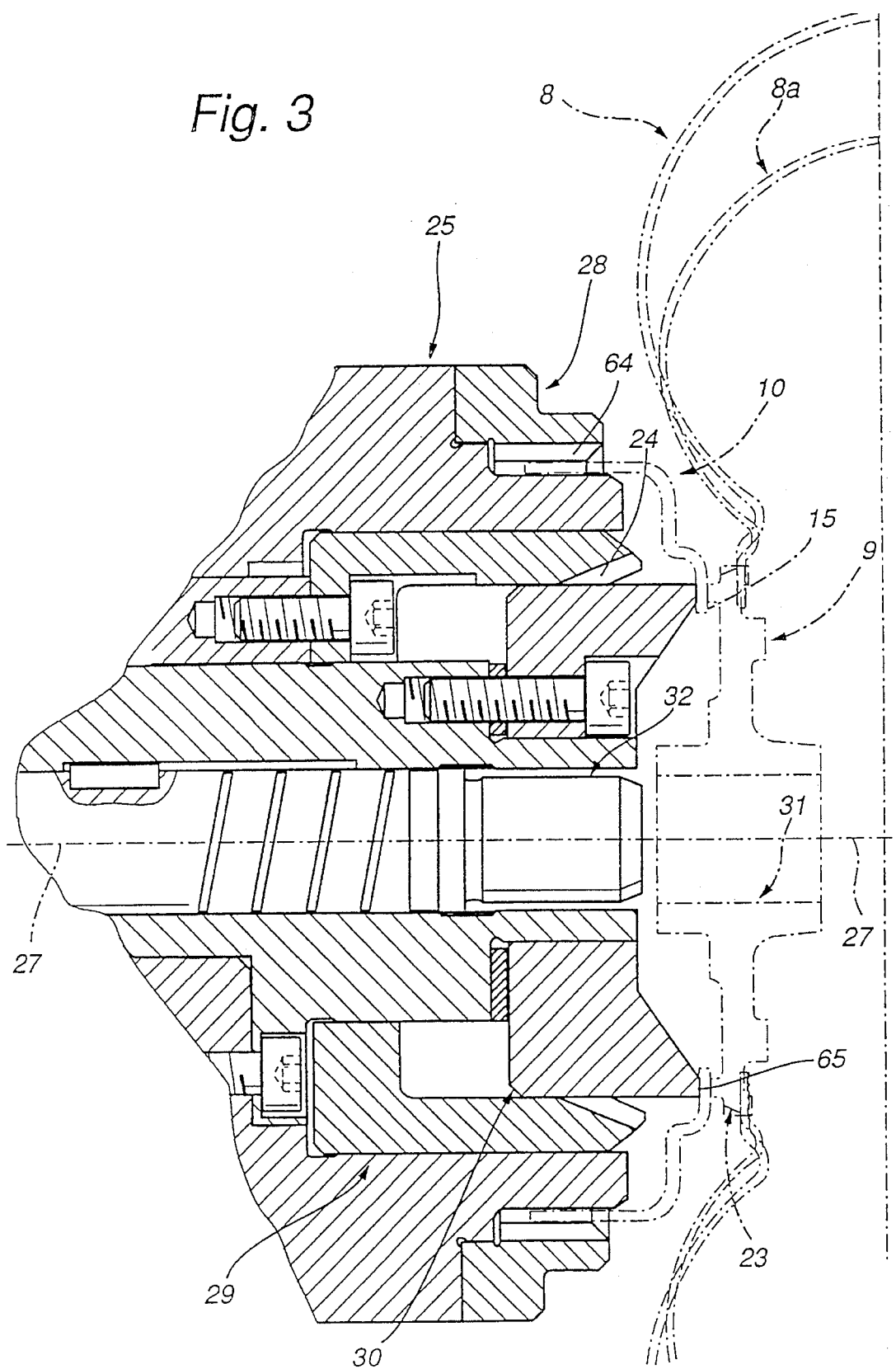
FIG. 3 is a representation of the universal receiving device which corresponds to FIG. 2, in a second operating position.

According to FIGS. 2 to 4, the friction welding machine, which is not shown in detail, comprises a rotationally drivable universal receiving device 25 for the hub 9 and the disk support 10 of the turbine wheel 5. According to FIGS. 3 or 4, the disk support 10 can be inserted in a form-fitting and non-rotatable manner in an annular receiving part 28 which is concentric with respect to the axis of rotation 27—27 of the universal receiving device 25, in which case the receiving part 28 has engaging surfaces 64 which are constructed to be complementary with respect to the axial grooves 63 (FIG. 1) of the disk support 10 in order to achieve the form-fitting for the driving of the disk support 10. Furthermore, the receiving part 28 is arranged in a fixed manner with respect to movements relative to the universal receiving device 25.

For producing the parts-side form-fitting surfaces 23, the universal receiving device 25 has another annular receiving part 29 which is provided with the counter-form-fitting surfaces 24 on its front end facing the joining parts, which counter-form-fitting surfaces 24 are used for the rotational drive of the hub 9 and, for example, during the upsetting operation, can stamp the form-fitting surfaces 23 into the flange 16 of the hub 9. The receiving part 29 is arranged to be concentric relative to the axis of rotation 27—27, non-rotatable and axially displaceable relative to the universal receiving device 25 as well as radially interior relative to the receiving part 28.

Furthermore, the universal receiving device 25 has an upsetting ring 30 which, on its front end facing the joining parts, is provided with a radial supporting surface 65 for the axial support of the projection 20 of the flange 16 during the friction welding of projection 13 and flange 14 (FIG. 2) or for the axial support of the flange 15 during the friction welding of flange 15 and projection 20 (FIGS. 3 or 4). The upsetting ring 30 is arranged to be concentric relative to the axis of rotation 27—27 and fixed with respect to movements relative to the universal receiving device 25 and radially interior relative to the receiving part 29.

For the centering of the hub 9, the universal receiving device 25 has a cylindrical centering mandrel 32 which can be moved into the central opening 31 of the hub 9. The centering mandrel 32 is arranged coaxially relative to the axis of rotation 27—27, non-rotatably and axially displaceably relative to the universal receiving device 25, and radially interior relative to the upsetting ring 30.

In the embodiment of FIG. 4, the centering mandrel 32 has a centering pin 33 on its end which can be moved out, which centering pin 33 is arranged to be coaxial relative to the axis of rotation 27—27 and fixed with respect to movements relative to the centering mandrel 32. The centering pin 33 has such a length that, during the welding operation, it is constantly supported by means of a bearing arrangement 34 with respect to an adapter plate 35, by way of which the turbine wheel 5—of which only the outer contour of the outer shell 8 (or in the case of a smaller converter diameter, of the outer shell 8*a*) is indicated by a dash-dotted line—is held on a base plate 66 of a receiving device 26 of the friction welding machine which is non-rotatable but can displaced in the directions of the axis of rotation 27—27. The adapter plate 35 is clamped in by means of fastening screws 36 on the base plate 66 with the use of one plastic bushing 37 respectively in such a manner that the adapter plate 35 can be slightly elastically deflected with respect to the base plate 66 in the directions which are perpendicular with respect to the axis of rotation 27—27—but is otherwise arranged to be fixed with respect to movements.

During the manufacturing, the flange 14 of the outer shell 8 is first welded to the projection 13 of the flange 16. For this purpose, the hub 9 is placed on the moved-out centering mandrel 32 and is caused to rest on the supporting surface 65 of the upsetting ring 30. Then, the receiving device 26 with the outer shell 8 clamped in the adapter plate 35 is moved toward the hub 9 and is fixed in the operating position while the flange 14 is placed on the projection 13. Then the receiving device 29 with the counter-form-fitting surfaces 24 is moved out until it rests on the flange 16 in order to stamp the parts-side form-fitting surfaces 23 into the flange 16, in which case the universal receiving device 25 will either still stand still or will already be rotationally driven. The subsequent upsetting and welding operation in the case of friction welding is known.

Subsequently, the flange 15 and the projection 20 are connected by means of friction welding. For this purpose, the receiving device 26 with the "outer shell 8—hub 9" arrangement is moved back and the receiving part 29 as well as the centering mandrel 32 are moved in so that the disk support 10 is inserted into the receiving part 28 and subsequently the projection 20 of the hub 9 is brought to rest against the flange 15 by an advancing of the receiving device 26, in which case, in the embodiment of FIG. 4, during the above-described operating maneuvers of the receiving device 26, the centering pin 33 may constantly be guided in the bearing arrangement 34. The subsequent welding and upsetting operation during the friction welding is known.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hydrodynamic torque converter comprising:

a lockup clutch, an outer shell holding turbine blades, a hub non-rotatably joining the outer shell with a turbine wheel shaft, and a disk support non-rotatably joining clutch disks of the lockup clutch with the outer shell, wherein said hub includes a radial flange which is connected on one axially facing side with the outer shell by a first friction weld connection and is connected at an opposite axial facing side with the disk support by a second friction weld connection, and wherein the hub is provided with form-fitting surfaces at its side facing the disk support for accommodating rotational drive of the hub by means of counter-form-fitting surfaces of a receiving device of a friction welding machine which grips the hub and is rotationally driven.

2. Hydrodynamic torque converter according to claim 1, wherein said first and second friction weld connections are radially offset with respect to one another.

3. Hydrodynamic torque converter according to claim 1, wherein the first friction weld connection is at a first axially extending projection at said one axially facing side of said radial flange, and wherein the second friction weld connection is at a second axially extending projection at said opposite axially facing side of said radial flange.

4. Hydrodynamic torque converter according to claim 3, wherein said second projection is disposed radially inwardly of said first projection.

5. Hydrodynamic torque converter according to claim 4, wherein said form-fitting surfaces are disposed on the radial flange at a position radially outwardly of at least of one of said first and second friction weld connections.

6. Hydrodynamic torque converter according to claim 5, wherein said form fitting surfaces include a radially outwardly facing surface of said radial flange.

7. Hydrodynamic torque converter according to claim 1, wherein said flange is disposed radially inwardly of said clutch disks.

8. A method of making a hydrodynamic torque converter of the type having a lockup clutch, an outer shell holding turbine blades, a hub non-rotatably joining the outer shell with a turbine wheel shaft, said hub having a radial flange, and a disk support non-rotatably joining clutch disks of the lockup clutch with the outer shell, said method comprising:

providing the hub with form-fitting surfaces at its side facing the disk support, providing a friction welding machine having a receiving device with counter-form-fitting surfaces, friction welding the radial flange on one axially facing side with the outer shell to form a first friction weld connection, and friction welding the radial flange on an opposite axial facing side with the disk support to form a second friction weld connection, wherein said friction welding includes driving engagement of the hub form-fitting surfaces at the disk support side of the hub by means of the counter-form-fitting surfaces of the receiving device of the friction welding machine which grips the hub and is rotationally driven.

9. A method according to claim 8, wherein said first and second friction weld connections are radially offset with respect to one another.

10. A method according to claim 8, wherein the first friction weld connection is at a first axially extending projection at said one axially facing side of said radial flange, and wherein the second friction weld connection is at a second axially extending projection at said opposite axially facing side of said radial flange.

11. A method according to claim 10, wherein said second projection is disposed radially inwardly of said first projection.

12. A method according to claim 11, wherein said form-fitting surfaces are disposed on the radial flange at a position radially outwardly of at least of one of said first and second friction weld connections.

13. A method according to claim 12, wherein said form fitting surfaces include a radially outwardly facing surface of said radial flange.

14. A method according to claim 13, wherein said flange is disposed radially inwardly of said clutch disks.

15. Friction welding apparatus for friction welding a turbine wheel of a hydrodynamic torque converter of the type having a lockup clutch, an outer shell holding turbine blades, a hub, non-rotatably joining the outer shell with a turbine wheel shaft, said hub having a radial flange, and a disk support non-rotatably joining clutch disks of the lockup clutch with the outer shell, said friction welding apparatus comprising:

selectively engageable first clamping surfaces for clampingly engaging said hub at a first axial side to facilitate holding of said hub during relative rotation of said radial flange and said outer shell during formation of a first friction weld connection of said outer shell to a second opposite axial side of said radial flange, and second selectively engageable clamping surfaces for clampingly engaging said disk support to facilitate holding said disk support during relative rotation of said disk support on said hub during formation of a second friction weld connection of said disk support to said first axial side of said radial flange.

16. A friction welding apparatus according to claim 15, wherein said first clamping surfaces are provided on first and second holding members, wherein said second clamping surfaces are provided on said second holding member, and wherein said first holding member is selectively axially movable with respect to said second holding member to accommodate formation of said first and second weld connections.

* * * * *